June 14, 1966  D. BLITZ  3,256,520
FEED THROUGH CANCELLATION FOR AN FM RADAR
Filed Jan. 4, 1963
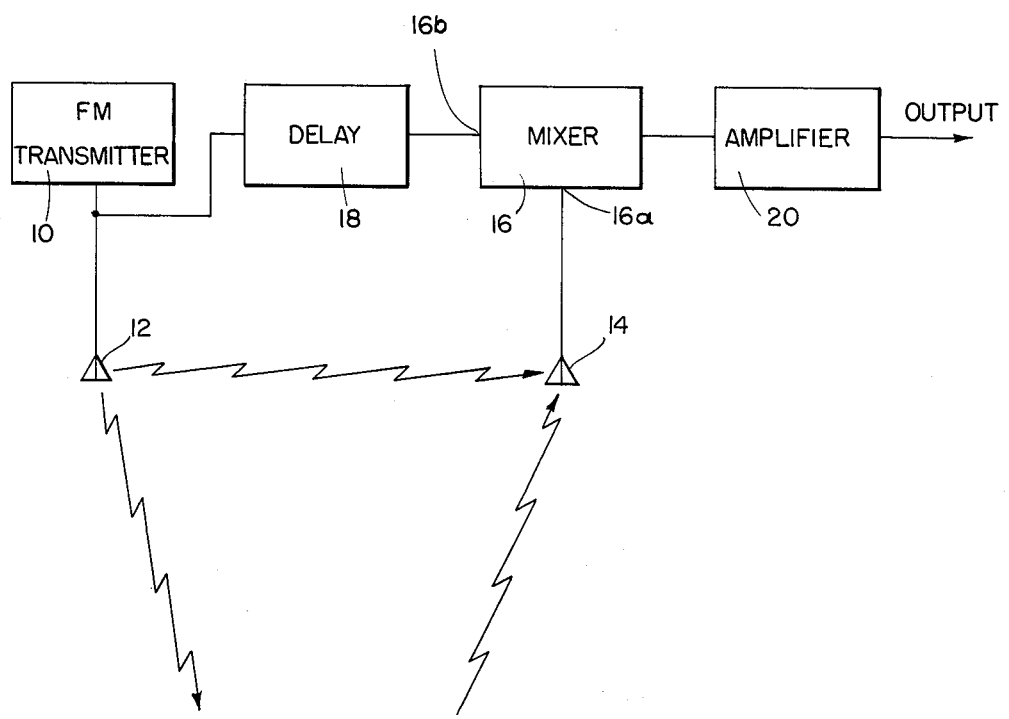
INVENTOR.
DANIEL BLITZ
BY
ATTORNEY United States Patent Office 3,256,520
Patented June 14, 1966

3,256,520
FEED THROUGH CANCELLATION FOR AN
FM RADAR
Daniel Blitz, Boston, Mass., assignor to Sanders Associates, Inc., Nashua, N.H., a corporation of Delaware
Filed Jan. 4, 1963, Ser. No. 249,428
2 Claims. (Cl. 343—14)

The present invention relates to frequency modulated radar ranging systems and more particularly to an arrangement for cancelling spurious signals which feed through from the radar transmitter to the receiver without being reflected from the desired target.

While the invention is discussed with specific reference to an aircraft altimeter, its application to other ranging applications will be readily apparent.

An FM altimeter makes use of a transmitter whose frequency is periodically swept back and forth. The output of the transmitter is directed from the vehicle toward the earth's surface, and the reflected signal is applied to one input of a mixer. The other input to the mixer is obtained directly from the transmitter. The frequencies at the two mixer inputs differ by the amount of the change in frequency of the transmitter during the time it takes for the radiated signal to traverse the path to the earth and return. Therefore, this frequency difference which appears at the output of the mixer, i.e., the beat frequency, depends on the altitude of the altimeter. A circuit which measures the beat frequency determines the range of the target with considerable accuracy.

The fact that a continuous wave FM altimeter transmits and receives simultaneously gives rise to certain problems, one being the fact that a certain portion of the transmitter antenna output feeds through more or less directly to the receiver antenna. For example, there may be leakage from the transmitting antenna to the receiving antenna, or the transmitted signal may be reflected to the receiving antenna by various parts of the aircraft. This feedthrough signal, when mixed with the signal being transmitted, results in a beat frequency signal which indicates a target at an extremely close range. This signal may be of large enough amplitude to override the weaker desired signal reflected from the earth. Additionally, if the flight of the aircraft is being automatically controlled, the control system may, even at high altitudes, be unable to distinguish between the true ground return signal and the feedthrough signal.

The problem may be alleviated to a great extent by increasing the spacing between the two antennas and thus reducing the intensity of signal feedthrough intercepted by the receiving antenna, or else increasing the size of the antennas to minimize side radiation. However, this solution would preclude the use of such altimeters in small aircraft and would not be practical for large aircraft, since it is difficult to provide sufficiently spaced mounting points for the two antennas.

Another suggested solution to this problem involves coupling the transmitting antenna directly to the receiving antenna. This coupling circuit has an electrical length such that the transmitted signal injected by it at the receiving antenna incurs a 180° phase shift with respect to the feedthrough signal. If the coupled signal is then given the same amplitude as the received signal, the two cancel each other. Unfortunately, with simple components, this method is effective only at certain frequencies, since the amount of phase shift suffered by the injected signal is dependent on its frequency. In order to overcome this limitation, it is necessary to include a relatively complex broad band phase shifter in the antenna coupling.

In addition, the effectiveness of this technique is materially reduced if the electrical length of the coupling circuit changes even a small fraction of a wavelength as the result of environmental changes. This will result in a material change in the phase shift of the injected signal and complete cancellation will not be effected.

A still further limitation of this technique is that it is amplitude sensitive. If, due to environmental changes, the amplitude of either the feedthrough signal or the injected signal changes, complete cancellation will not result. In either case of incomplete cancellation, the resulting spurious input to the receiver has the frequency of the feedthrough signal, with a consequent error-causing beat frequency component. Thus, the above cancellation technique does not lend itself to effective solution of the feedthrough problem.

Accordingly, the present invention has for its object the provision of a system for nullifying the effect on FM radar systems of the feedthrough signal intercepted by the receiver.

A more specific object of the invention is to provide a system for cancelling the feedthrough signal incident on the receiving antenna in an FM altimeter.

A still further object is to provide a feedthrough signal cancellation system which is relatively insensitive to environmental changes.

Other objects of the invention will in part be obvious and will in part appear hereinafter.

The invention accordingly comprises the features of construction, combination of elements and arrangement of parts which will be exemplified in the construction hereinafter set forth and the scope of the invention will be indicated in the claims.

The sole figure of the drawing is a block diagram of an embodiment of the present invention as used in an FM radar altimeter.

In general, the invention makes use of means for delaying the transmitted signal prior to its injection into the mixer. The time of this delay is adjusted to equal the time required for the feedthrough signal to reach the mixer via the transmitting and receiving antennas. The beat frequency resulting from the mixing of these two signals is then zero and thus will have no effect on the beat frequency signal. It is a simple matter to adjust the altimeter's computer circuitry to account for this delay in calculating the range or altitude.

As shown in the drawing, a frequency-modulated transmitter 10 develops a signal which is supplied to a transmitting antenna 12. This signal, whose frequency varies periodically as a function of time, is radiated by the transmitting antenna 12 in a directive manner towards the earth as shown. The signal reflected by the earth is intercepted by a receiving antenna 14 and fed to an input terminal 16a of a detector or mixer 16. As illustrated in the drawing, a portion of the transmitted signal may leak directly from the transmitting antenna 12 to the receiving antenna 14, giving rise to an undesirable feedthrough signal which is also coupled to the mixer 16.

In accordance with the present invention, the signal conventionally fed from the transmitter to a second input terminal 16b of the mixer is coupled to the mixer 16 through a delay element 18. This delay element 18, which may be a piece of transmission line, is adjusted to provide a delay equal to the time required for the feedthrough signal to travel from the transmitter 10 to the mixer 16. The frequency of the delayed signal is thus equal to the frequency of the feedthrough signal at the mixer 16, and the difference frequency developed by the mixer 16 in response to the feedthrough signal is therefore zero. This zero beat frequency signal, which is actually a D.-C. signal, is outside the pass band of the beat frequency amplifier 20 and is thus ignored by the system.

The ground return signal detected by the receiving antenna 14 is mixed with the delayed transmitted signal in the mixer 16 to develop a beat frequency signal whose frequency is essentially proportional to the time required for the ground return signal to complete its propagation from the transmitting antenna 12 to the receiving antenna 14. This beat frequency signal is amplified by the beat frequency signal amplifier 20 and fed to suitable computing circuitry, not shown, which responds to the beat frequency. The computing circuitry is calibrated to account for the presence of the delay circuit 18 in calculating the altitude.

It should be noted that, as an alternative, the present invention can be adapted to cancelling false return signals emanating from other sources. These may include signal reflection from parts of the aircraft, such as the landing gear, gas tanks and propellors.

It will be noted that the system described herein is relatively insensitive to environmental changes. Since the injected signal and the feedthrough signal are heterodyned to zero beat frequency to provide cancellation; changes in signal amplitude will have no effect. Additionally, a beat frequency signal resulting from incomplete cancellation due, for example, to small changes in the electrical length of the injected signal path will be so low in frequency as to be below the pass band of the amplifier.

The present invention thus provides a simple and convenient system for cancelling the effect of signal feedthrough between the transmitting and the receiving antenna by delaying the transmitted signal a predetermined amount prior to its injectoin into the mixing circuit. Upon appropriate adjustment of the delay network, the feedthrough signal intercepted by the receiving antenna will have the same frequency as the injected transmitted signal, and, when the signals are mixed, a zero beat frequency results. This is ignored by the system.

While the invention has been described with reference to a system in which the transmitter outfit is used directly as one of the mixer inputs, it will also be advantageous to use it in I.F. type systems.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. In a frequency modulated radar system including means for nullifying the effect of spurious return signals, said system comprising
    (a) a transmitter for developing an output signal having a frequency which varies as a function of time,
    (b) an antenna for radiating said output signal,
    (c) a receiving antenna for receiving radar return signals and spurious signals from said radiating antenna,
    (d) a mixer circuit having a first signal input provided by said receiving antenna and a second signal input derived from said transmitter,
    (e) connecting means applying said derived transmitter signal to said mixer and delaying said second signal input such that said spurious signals are beat against said second signal input in said mixer to effectively cancel said spurious signals.

2. The system claimed in claim 1 wherein said connecting means has an effective length substantially equal to the path length of said spurious signal.

References Cited by the Examiner
UNITED STATES PATENTS

| | | | |
|---|---|---|---|
| 2,261,272 | 11/1941 | Newhouse | 343—14 |
| 2,520,553 | 8/1950 | Lawson | 343—14 |

CHESTER L. JUSTUS, *Primary Examiner.*

R. E. KLEIN, *Assistant Examiner.*